United States Patent [19]

Cazzaniga

[11] 4,437,771
[45] Mar. 20, 1984

[54] METHOD AND APPARATUS FOR INDIRECT MEASUREMENT OF THERMAL ENERGY

[75] Inventor: Luigi Cazzaniga, Milan, Italy

[73] Assignee: Cazzaniga S.p.A., Milan, Italy

[21] Appl. No.: 337,959

[22] Filed: Jan. 8, 1982

[30] Foreign Application Priority Data

Sep. 30, 1981 [IT] Italy ............... 24233 A/81

[51] Int. Cl.³ ............... G01K 17/06
[52] U.S. Cl. ............... 374/39; 236/94; 364/557
[58] Field of Search ............... 236/94, DIG. 8; 364/418, 505, 557; 374/39

[56] References Cited

U.S. PATENT DOCUMENTS

| | | | |
|---|---|---|---|
| 3,700,865 | 10/1972 | Ley | 235/150 |
| 3,854,038 | 12/1974 | McKinley | 235/151.34 |
| 4,002,890 | 1/1977 | Welin | 235/151.3 |
| 4,157,034 | 6/1979 | Buchele | 73/193 |
| 4,221,260 | 9/1980 | Otala et al. | 165/11 R |
| 4,234,927 | 11/1980 | First | 364/418 |
| 4,244,216 | 1/1981 | Dukelow | 73/190 |
| 4,245,501 | 1/1981 | Feller | 73/193 |
| 4,363,411 | 12/1982 | Feinberg | 236/94 |

FOREIGN PATENT DOCUMENTS 1546507  5/1979  United Kingdom .

*Primary Examiner*—Herbert Goldstein
*Attorney, Agent, or Firm*—Bernard, Rothwell & Brown

[57] ABSTRACT

The described method and apparatus are relative to the indirect measurement of thermal energy delivered to numerous heating elements, part of one or several zones, for instance all the radiators in an apartment or all the radiant panels of single family quarters. The apparatus consists of a temperature sensor which outputs an electric signal depending upon the temperature of the carrying fluid in which it is immersed and corrected as a function of the type of heating unit used (radiators, fan-coils, radiant panels, convectors, etc.) since each system has a different thermal emission for an equal temperature of the fluid, an electronic circuit for processing the signal, valving devices for interception of the heat carrying fluid, and a counter device sensitive to the processed temperature signal, which device is sensitive to the added energy supplied, in a given time period to the various controlled rooms, each room having attributed to it its own thermal capacity by means of a programmable scaling circuit, when the interception valving devices for the heat carrying fluid let this fluid through.

18 Claims, 6 Drawing Figures

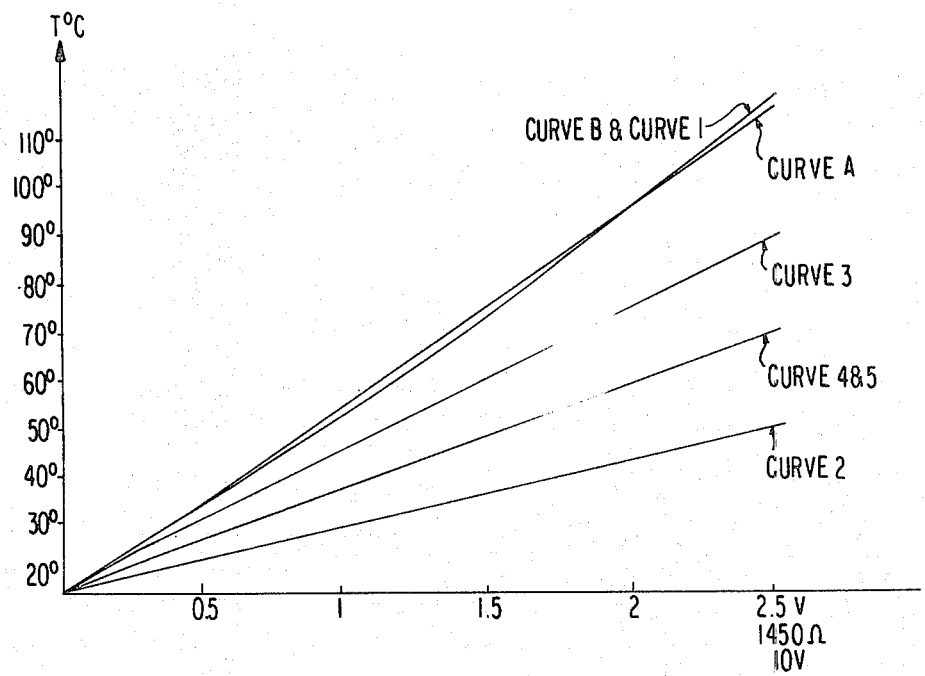
FIG. 2
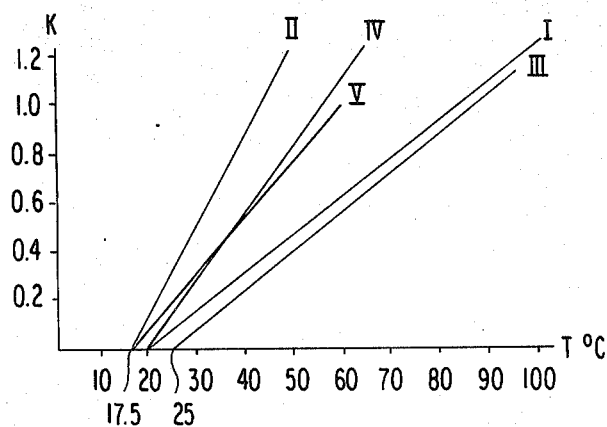
FIG. 5
FIG. 6
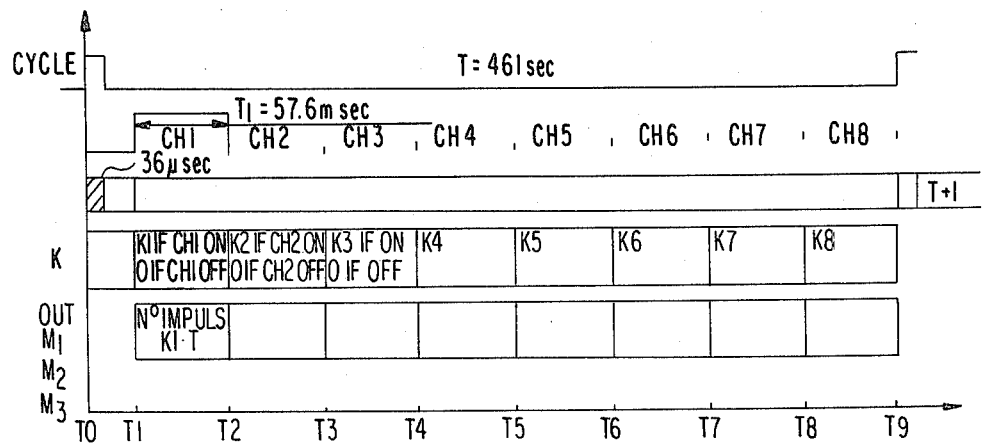

METHOD AND APPARATUS FOR INDIRECT MEASUREMENT OF THERMAL ENERGY

BACKGROUND OF THE INVENTION

The present invention relates to a method and an apparatus for the indirect measurement of the thermal energy supplied to one or several zones each of which includes one or more rooms with one or more heating elements such as radiators, floor-heating panels, convectors, fan-coils, Pex type heaters and other similar heating panels.

Two types of measurement of the heat supplied are generally known: the direct and the indirect methods. The direct method permits direct measurement of all the variables used for determining the quantity of heat used, that is the volume or mass of heat transfer fluid flow and the difference between the temperatures of the fluid supplied to each unit and the fluid returned from each unit. According to the indirect method, only some variables are measured directly, while the remaining variables are preset or calculated from measured variables.

SUMMARY OF THE INVENTION

The method and apparatus described herein is utilized in a multi-zone heating system, and contemplates the measurement of thermal energy consumed by each zone as well as the regulation of the temperature in the zone or zones by means of a thermostat in one room, called a pilot room, or zone of the building or complex, or by a plurality of thermostats placed within the respective zones or apartments of the system. Furthermore, this method and apparatus are usable with programmable thermostats permitting a user to program the period of time during which the selected general room temperature is wanted as well as the period during which an attenuated temperature is wanted, and this at daily as well as weekly levels.

According to the present invention, the heat quantity consumed is calculated by means of measuring only the temperature of the heat carrying fluid being distributed to the individual zones, and detecting the status of valves controlling the flow of heat carrying fluid in the individual zones, and by means of one or more memory tables containing heat transfer factors or coefficients K2, and selectors preset in accordance with heating capacity coefficients K of the respective zones. The measured heat carrying fluid temperature is utilized to select a heat transfer coefficient K2 which is proportional to the unit heat transfer of the measurement temperature of the heat transfer device employed in the heating system; the different tables represent heat transfer coefficients for different heat transfer devices, and the appropriate table is preselected during installation. The selectors are similarly preset during installation to selector settings representing the heating capacity coefficients K of the respective zones, i.e. the size or number of heating devices or registers within the respective zones. Sequences of trains of pulses are adjusted in frequency by variable multiplier/divider circuits controlled by the coefficients K2 and K; the selected heat transfer coefficient K2 being applied during the whole sequence while the zone heating capacity coefficients K are applied sequentially to adjust the frequency of the corresponding trains representing the corresponding zones. Detected valve operating signals for the corresponding zones are utilized to disable pulse generation in trains corresponding to zones in which transfer heating fluid flow is stopped by the zone valve.

Therefore, with the present apparatus, the concept of measurement per zone is no longer limited to plants built with the zone system, but can be extended to any type of plant with any number of heating units per room, with any type of heating unit used (radiators, floor-heating panels, convectors, fan-coils, etc.) and whatever their capacity. This method, besides permitting the measurement and count of the thermal energy used by every user, also permits regulation and programming of the requirements differentiated either at zone level or individually for each room, with the maximum possible saving without prejudicing comfort.

Furthermore, this apparatus is provided with some special devices constituting an added improvement including an anti-freeze device not permitting the temperature in rooms where heat is turned off to go below a given level, so as to avoid damage. When the heat carrying fluid temperature goes down below a given level, so that heat supply to the rooms becomes nul, the count ceases. A summer/winter switch avoids an inexact calculation resulting from the high temperature in the rooms in the summer. Any thermostat, programmed or not, on the market can be used in practicing the invention.

The installation of this apparatus in climatization plants, generally speaking, heating, cooling, ventilation plants, permits, since it takes into account the fluid temperature, the emission capacity of heating units which is a function of the type, temperature and size of the unit and the time during which the fluid is supplied to these units, the non-determination of measurement and counting errors due to changes in external weather conditions and therefore in fluid temperature or due to changes in the regulation conditions of each room or the entire zone. Such a device installed in every zone permits an exact subdivision of energy consumption expenses, giving the user the possibility of self-control.

BRIEF DESCRIPTION OF THE DRAWINGS

A non-limitative example of realization of an apparatus according to the present invention will be now described, with reference to the drawings, in which:

FIG. 2 is a diagram showing some curves used to explain the apparatus according to the invention;

FIG. 5 is a diagram showing further curves useful to explain the apparatus according to the invention; and FIG. 6 is a time diagram of the apparatus in FIG. 1.

DESCRIPTION OF THE PREFERRED EMBODIMENT

Figure 1:
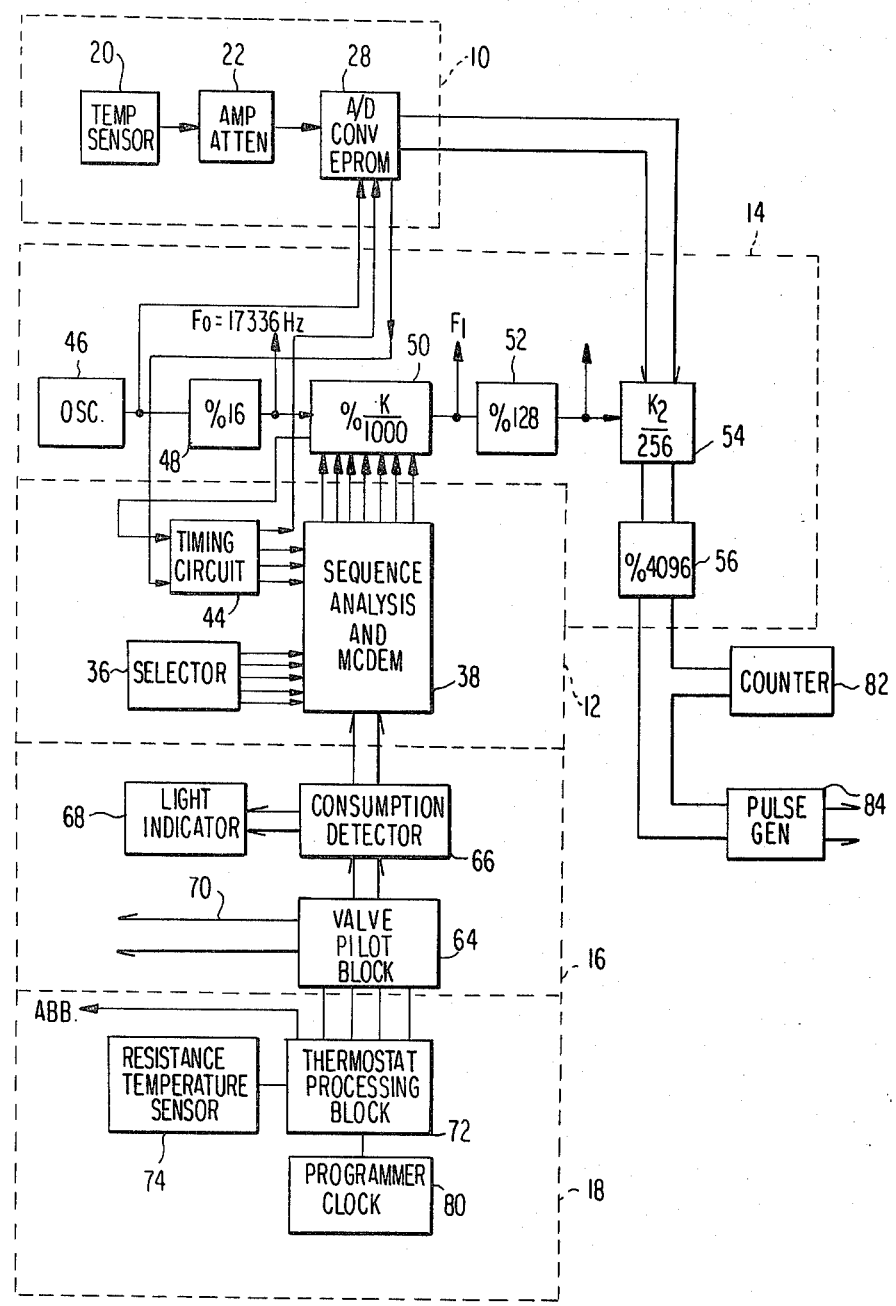
FIG. 1 is a block diagram of the apparatus according to the invention.

With particular reference to FIG. 1 of the drawings, the apparatus according to the present invention essentially consists in a block 10 for determination of the heat transfer factor or coefficient K2, a block 12 for sequentially generating zone heating capacity coefficients K, a block 14 controlled by the blocks 10 and 12 for generating a sequence of trains of pulses representing the quantity of heat consumed in the corresponding zones, a valve control block 16, and a block 18 generating pilot or control room temperature data.

Figure 3:
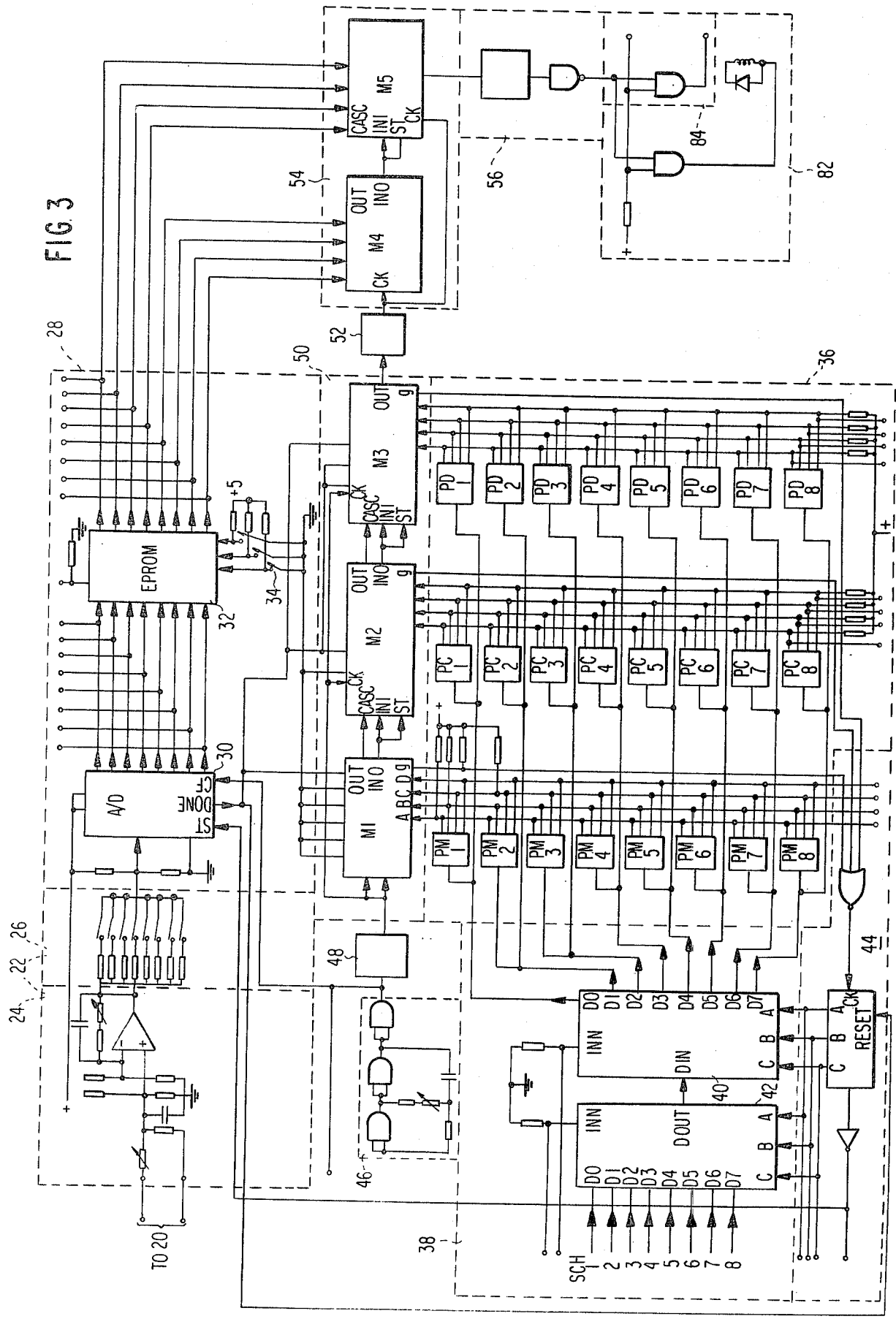
FIGS. 3 and 4 are detailed schematic diagrams of the apparatus in FIG. 1.

The block 10 for determination of the factor K2 includes a sensor 20 for sensing the temperature of the heat transfer fluid being distributed to the zones. The sensor 20 includes a resistance having the characteristic curve which is illustrated by the curve A in FIG. 2. A block 22 connected to the temperature sensor 20 includes an amplifying bridge circuit 24 and an attenuator network 26 (see FIG. 3). A block 28 connected to the output of block 22 includes an analog-to-digital converter (A/D) 30 and a read only memory (EPROM) 32. The output of the amplifying bridge circuit 24 of block 22 is shown by the curve B of FIG. 2. It shows an almost linear behavior of the circuit for temperatures between 15° C. and 115° C. The attenuator network 26 inserted in the output of the amplifying bridge circuit 24 in block 22 permits selecting the same output voltage for several different temperature ranges, as shown by curves 1, 2, 3, 4 and 5 of FIG. 2, which will be better explained later. The attenuation value that may be preset is determined according to the type of heating system. The signal at the output of the block 22 is applied to the A/D converter 30 (see FIG. 3) whose outputs are connected to address inputs of the EPROM 32 in which different heat transfer coefficients are stored at addresses corresponding to the temperature measured by the sensor 20. The digital output of the A/D converter 30 changes step-wise in response to changes in temperature of the heat transfer fluid according to the attenuation value of the attenuator network 26; for instance, attenuator settings corresponding to respective curves 1, 2, 3, 4 and 5 of FIG. 2 result in steps or different addresses from A/D converter 30 for temperature changes of 0.41° C., 0.138° C., 0.309° C., 0.208° C. and 0.218° C., respectively. Also, any other intermediary curve may be obtained with other attenuation values to produce other temperature response step addresses from the A/D conveter 30. The values of coefficients K2 stored in the EPROM 32 have an accuracy of 0.5 percent. Switches 34, connected to additional address inputs of EPROM 32, permit preselection during installation of eight sets or tables of heat transfer coefficients K2 in accordance with different types of heating systems. FIG. 5 shows the characteristic curves of respective memorized heat transfer coefficients K2 as a function of temperature for various types of radiant elements and, more precisely, curve I concerns radiators, curve II concerns ground panels, curve III concerns convectors, curve IV concerns fancoils, and curve V concerns Pex type and similar panels. The value of the coefficient K2 is considered the same for all channels (zones or apartments) and is revised every 461 ms, as will be better expalined later.

Block 12 for the generation of the coefficients K includes a selector unit 36 containing three selectors for each separate zone or apartment. The coefficients K indicating the capacity for heat transfer at any instant by the zones (from 10 to 9990), by steps of 10, are set by unit 36 selectors $PM_1$ to $PM_8$, $PC_1$ to $PC_8$ and $PD_1$ to $PD_8$ (see FIG. 3). As will be better descirbed later, current sensors are inserted in the valve control circuit so as to sense currents activating the valves for the corresponding zones. Sequence analysis block 38 includes a demultiplexer 40 and a multiplexer 42 operated by a timing circuit 44 for sequentially passing signals from the current sensors to the respective selectors $PM_1$ to $PM_8$, $PC_1$ to $PC_8$ and $PD_1$ to $PD_8$, one of the PM, one of the PC, and one of the PD selectors being operated simultaneously. If passage of current is detected in a valve or valves for one zone, the corresponding coefficient K, as preset by the corresponding set of three selectors, is applied to the divider block 50. Vice versa, a nul output of block 38 results if no current is detected and results in no coefficient K being applied to the divider 50.

The electrical processing unit 14 for the determination of the quantity of heat used includes an oscillator 46 which generates a square wave with a 277,375 Hz frequency used as the conversion frequency for the analog-to-digital converter 30 and for generating the various timings required by the circuit. This frequency is divided by sixteen in a frequency divider 48, for which a 17.366 Hz frequency is obtained which is used as the clock signal for frequency generators $M_1$, $M_2$ and $M_3$ constituting the frequency divider/multiplier 50 with variable divisor equal to K/1000. The pulse trains at the output of frequency divider 50 are sent to a symmetrization circuit consisting of a frequency divider 52 with a divisor of 128, the output of which is sent to a multiplier circuit 54 consisting in frequency generators M4 and M5 where the pulse train is multiplied by K2/256. The output of the multiplier circuit 54 is further divided by a frequency divider 56 with divisor of 4096 so as to obtain the correct frequency corresponding to the total of all emitted pulses which total is counted and stored in counter 82.

The timings used are shown in FIG. 6. At the beginning of the cycle, during the time $T_0$-$T_1$, the coefficient $K_2$ associated with the measurement of the temperature of the fluid is first read into the A/D converter by an output of the timer circuit 40. Eight equal intervals of time of 57.6 ms each follow, during the first of which, from $T_1$ to $T_2$, a number of pulses corresponding to the tens of kilocalories emitted by the channel 1 in the time T of the complete cycle come out of divider 50. The same occurs for the other seven channels in the seven following intervals up to $T_9$, after which the cycle is repeated.

Figure 4:
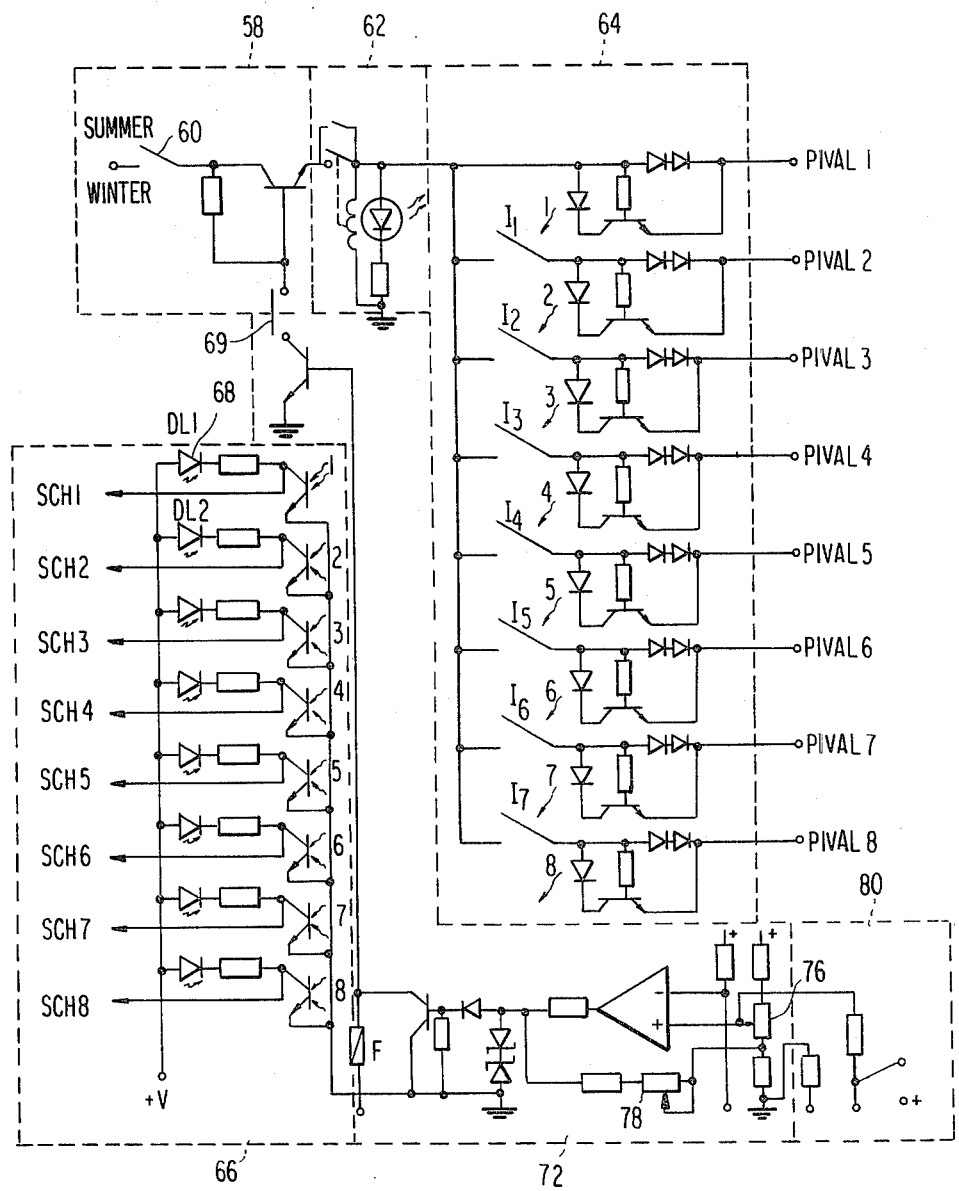

The valve control block 16 includes an on/off control circuit 58 (see FIG. 4) able to pass a 24 volt potential with a current of 3 amps, which is sufficient to operate a maximum of 14 valves if a SUMMER/WINTER switch 60 is closed (i.e. in the WINTER position). The switch 60 prevents counting which could occur during hot weather in SUMMER if the apparatus is still operational. Following the circuit 58 is an overload protection circuit 62 which is provided with an indicator light indicating the presence of the exitation voltage of the output of the control circuit 58. Moreover, the control circuit 58 is provided with a switching transistor continuously passing current to the valves when a jumper 69 is open calling for operation of the valves by corresponding thermostats in each room, or when the jumper 69 is closed, only exiting the valves when it receives a signal from pilot room thermostat processing circuit in block 18. The output of the protection circuit 52 is connected to a block 64 containing circuit sensors for detecting current passing through the respective valves for the zones. A light emitter diode is connected for being energized by current passing to each output PIVAL-1 to PIVAL-8, in order to detect the passage of current (from 10 MA to 3 A) to the respective valve or valves. The LED's are coupled by means of optical connections to optical detectors (phototransistors) of a block 66 for applying signals to lines $SCH_1$ to $SCH_8$ corresponding to energization of the respective valves, the lines $SCH_1$ to $SCH_8$ being connected to the sequential analysis block 38 as well as to respective light indicators 68 for indicating consumption on the corresponding channel. Furthermore, block 64 includes separate switches $I_1$ to $I_7$ which can selectively connect or disconnect the outputs of PIVAL-2 to PIVAL-8 from the energization voltage.

The block 18 for sensing pilot room condition data includes a thermostat processing block 72 with a resistance temperature sensor 74 placed in the pilot room, and a comparator on which the user sets the desired temperature (between 12° C. and 22° C.) and the hysteresis (between 0.5° C. and 5° C.) by means of the potentiometers 76 and 78. When the temperature in the pilot room is lower than the desired temperature, the block 72 turns the control circuit 58 on, and when the temperature of the pilot room is higher, the control circuit 58 is turned off. The processing block 72 is also built for operation in connection with a programmer clock 80 on a daily or weekly basis.

When operation in attenuated conditions is required, the pilot room temperature setting becomes 12° C. independently from the selected value. Furthermore, a control signal is provided for damping thermostats. The apparatus according to the present invention permits, therefore, calculation in KWh on an electromechanical counter 82 of the heat used by an inhabited unit. It operates correctly, giving the same services on various types of plants including radiators, floor panels, convectors, fan-coils, etc. This apparatus is also able to run up to eight zones or seven zones plus a pilot zone for a total of fourteen valves; it also provides for emission, by means of a remote pulse generator 84, of counting pulses to a collecting station and permits the use of thermostats in every zone. There is a possibility of introducing a daily or weekly programmer clock 80, permitting operation in attenuated conditions for relative use of the pilot room or if it supplies the different thermostats with a signal that attenuated conditions are required.

Two types of operation are contemplated:
(a) Operation with pilot room.

A room temperature sensor 74 is placed in a pilot room, the desired temperature is selected on the station and compared with the value given by the room temperature sensor 74. All the valves of all connected zones are activated until the pilot room temperature reaches the set value. With this type of operation, the programmer clock 80, if connected, causes a determined lowering, during the pre-selected hours of the temperature selected for the pilot room.

(b) Operation with thermostat.

Thermostats are connected in the various zones, the pilot room not being used, the quantity of heat consumed is thus counted every time that a thermostat activates the valves of a zone. Of the eight zones that the apparatus is able to control, it is possible to exclude, independently from the signals supplied by the thermostats or the pilot room, any of the zones except zone No. 1 which is only excluded together with all the other ones, by means of the SUMMER/WINTER selector.

Obviously, numerous different variants and modifications can be brought by a technical expert to the above described realization of the present invention, without going away from its spirit; it is therefore understood that such variants and modifications come within the scope of the claimed invention.

I claim:

1. An apparatus for indirect measurement of the thermal energy supplied to a plurality of zones by flow of a heat carrying fluid from a common heating system wherein a plurality of valves control the supply of the heating fluid to the respective zones, the apparatus comprising:

a heating fluid temperature sensor for sensing the temperature of the heat carrying fluid being distributed to the zones, memory means containing a plurality of heat transfer coefficients which are proportional to unit heat transfer rates of heat transfer devices in the zones relative to corresponding temperatures, means responsive to the heat carrying fluid temperature sensor for selecting one of the memorized heat transfer coefficients, preset heating capacity coefficient means for generating heating capacity coefficients of the corresponding zones, and an electronic processing circuit including a frequency generator and variable multiplier means responsive to the selected heat transfer coefficient and the zone heating capacity coefficients for generating series of pulses having frequencies corresponding to heat consumption in the respective zones.

2. An apparatus according to claim 1, wherein the means for selecting one memorized heat transfer coefficient includes an amplifier bridge circuit operated by the heating fluid temperature sensor, and an analog-to-digital converter connected to the output of the amplifier bridge circuit; and wherein the memory means includes a read only memory in which the plurality of heat transfer coefficients are stored and having address terminals connected to digital outputs of the analog-to-digital converter for selecting the corresponding heat transfer coefficient.

3. An apparatus according to claim 1 including preset switching means connected to additional address terminals of the read only memory for selecting additional sets of heat transfer coefficients corresponding to different types of heat transfer facilities.

4. An apparatus according to claim 2, wherein the means for selecting one memorized heat transfer coefficient includes an attenuator network connected between the output of the amplifier bridge circuit and the input of the analog-to-digital converter so as to provide additional temperature ranges suitable for use of different heating systems.

5. An apparatus according to claim 1, wherein said means for generating the preset heating capacity coefficients includes a plurality of selectors corresponding to the respective zones and which can be manually set to the corresponding coefficients, a plurality of flow sensors for sensing open conditions of the respective valves controlling the heat carrying fluid to the respective zones sequential analysis means responsive to the plurality of sensors for energizing the corresponding selector to apply the corresponding zone heating capacity coefficient to the electronic processing circuit so that sequential trains of pulses are produced having the respective frequencies corresponding to the heat consumed within the zones.

6. An apparatus according to claim 5 wherein the sequential analysis circuit includes a multiplexer having inputs connected to the respective plurality of sensors a demultiplexer having an input connected to the output of the multiplexer and having outputs connected to the respective selectors, said selectors being connected to said electronic processing circuit, and timing means for operating the multiplexer and demultiplexer in synchronism to sequentially activate the respective selectors when the corresponding sensor indicates that the corresponding valve is open.

7. An apparatus according to claim 6 wherein said sensors include photocouplers with LED's connected to the energized when current passes to the corresponding valve, and phototransistors optically coupled to the LED's for operating the inputs of the multiplexer.

8. An apparatus according to claim 7 including a plurality of light omitting devices energized by the phototransistors for indicating the consumption of heat within the corresponding zones.

9. An apparatus according to claim 1 including pilot room control means having a resistance temperature sensor, and control means responding to the resistance temperature sensor for controlling operation of all the heating zones in accordance with the temperature of a pilot room.

10. An apparatus according to claim 9 wherein the control means includes a potentiometer for setting the desired temperature, and a second potentiometer for setting the desired hysteresis.

11. An apparatus according to claim 9 including a connection to which a daily or weekly programmer clock may be connected to control operation at a lower set temperature.

12. An apparatus according to claim 1 including control means for setting the valves controlling the heat carrying fluid to the zones having an on/off voltage circuit including a switch for disconnecting the circuit from a power source to prevent operation, an overload protection circuit in series with the on/off circuit, and branching circuit means connecting the series circuit of the on/off circuit and the protection circuit to the valves.

13. An apparatus according to claim 12 wherein the branching circuit means includes means suitable for connecting thermostats in series with each of the corresponding valves, and current sensing means for detecting current in each of the branches to the valves to operate the preset heating capacity coefficient means.

14. An apparatus according to claim 12 including a plurality of switches in series with some of the respective branch circuits for selectively opening or closing circuits to the corresponding valves.

15. An apparatus according to claim 12 including thermostat means for inclusion within a pilot room for controlling the on/off switch means to simultaneously control operation of all the zones in response to the temperature within the pilot room.

16. An apparatus according to claim 1 wherein said electronic processing circuit includes a counter for totalizing the quantity of heat consumed by the zones.

17. A method for the indirect measurement of the thermal energy supplied to zones by a heat carrying fluid wherein flow of the heat carrying fluid in the respective zones is controlled by respective valves associated with the zones, the method comprising the steps of:
  sensing the temperature of the heat carrying fluid being distributed to the zones,
  selecting a heat transfer coefficient from a table of heat transfer coefficients stored within a memory in accordance with the sensed temperature of the heat carrying fluid so that the selected heat transfer coefficient corresponds to a unit heat transfer rate of the heating system,
  detecting energization of the corresponding valves controlling flow of heat carrying fluid to the zones,
  producing preset zone heating capacity coefficients, only in response to the detecting of a corresponding energization of a valve,
  generating a continuous train of pulses,
  multiplying the train of pulses by a fractional value proportional to the selected heat transfer coefficient, and
  multiplying successive portions of the continuous train of pulses by fractional values proportional to the corresponding zone heating capacity coefficients so that a plurality of pulse groups are produced having corresponding frequencies indicating the quantity of heat being consumed within the respective zones.

18. A method according to claim 17 wherein the selecting of the heat transfer coefficient includes converting an electric signal generated by the sensing of the temperature of the heat transfer fluid into a digital representation, applying the digital temperature representation to address inputs of a addressable memory circuit containing the stored heat transfer coefficients to select a corresponding one of the coefficients.

* * * * *